US005619637A

United States Patent [19]
Henshaw et al.

[11] Patent Number: 5,619,637
[45] Date of Patent: Apr. 8, 1997

[54] METHOD AND SYSTEM FOR AUTOMATIC STORAGE OF AN OBJECT WITHIN A CONTAINER OBJECT WITHIN A GRAPHICAL USER INTERFACE WITHIN A DATA PROCESSING SYSTEM

[75] Inventors: Susan F. Henshaw; Sarah D. Redpath, both of Cary, N.C.

[73] Assignee: International Business Machines Corporation, Armonk, N.Y.

[21] Appl. No.: 160,623

[22] Filed: Dec. 2, 1993

[51] Int. Cl.⁶ ................................................. G06F 19/00
[52] U.S. Cl. ......................... 395/159; 395/340; 395/326
[58] Field of Search .................................... 395/155, 157, 395/159, 160

[56] References Cited

U.S. PATENT DOCUMENTS 4,953,080  8/1990  Dysart et al. .
5,072,412  12/1991  Henderson, Jr. et al. .
5,117,496  5/1994  Stearns et al. .

OTHER PUBLICATIONS

Aker, S.Z. *The Macintosh Companion.* Jul. 1991. pp. 129, 134–141, 146–147.
Aker, S.Z., The Macintosh Companion, Jul. 1991, pp. 14 & 15.

*Primary Examiner*—Kee M. Tung
*Attorney, Agent, or Firm*—Gregory M. Doudnikoff

[57] ABSTRACT

The automatic storage of an object within a container object within a graphical user interface within a data processing system. A display, included within the data processing system, is utilized to display an iconic representation of a container object which is a graphic indication of a storage of objects. An object and a container object within the graphical user interface are specified. The object is thereafter associated with the container object. During utilization the object is removed from the container object. The object is then automatically stored within the container object in response to a completion of the utilization to enhance the organization of objects within the container object and the graphical user interface.

6 Claims, 8 Drawing Sheets

METHOD AND SYSTEM FOR AUTOMATIC STORAGE OF AN OBJECT WITHIN A CONTAINER OBJECT WITHIN A GRAPHICAL USER INTERFACE WITHIN A DATA PROCESSING SYSTEM

BACKGROUND OF THE INVENTION

1. Technical Field

The present invention relates in general to an improved graphical user interface in a data processing system and in particular to a method and system for the automatic storage of an object within a container object within a graphical user interface in a data processing system. Still more particularly, the present invention relates to a method and system for the automatic storage of an object within a container object within a graphical user interface in a data processing system in response to completion of utilization of the object.

2. Description of the Related Art

Data processing systems commonly utilize graphical user interfaces to enable users to interact with the data processing system and manipulate the activities and functions available to the users. Users may select, through the graphical user interface, a particular activity to perform utilizing input devices such as a keyboard or a "mouse." In a graphical user interface, activities such as "print document" or "select a document" may be represented to the user in the form of function keys graphically displayed on the computer display screen and selected by striking a particular key on the keyboard, or as icons to be selected utilizing a graphical pointing device such as a "mouse." A pointer, or mouse cursor, on the display screen is typically utilized to represent the current location of the "mouse." By moving the "mouse," a user may move the pointer, or mouse cursor, around within the computer display screen.

An object may be graphically represented to a user as an "icon" utilizing the graphical user interface. An object is an item which may be manipulated as a unit. Objects may be of three types: device, data, or container. A device object may be manipulated to perform a selected task such as typically performed utilizing a physical or logical device such as a printer, mouse, or facsimile machine. For example, a "printer" device object may be manipulated to print documents or text. Data objects may include documents or text, such as created utilizing word processing applications. Container objects are typically objects into which other objects may be stored. Therefore, objects may be stored together in a container object and manipulated as a unit by manipulating the container object.

Container objects, commonly called "folders," are typically provided as part of a graphical user interface. These "folders" may be iconically represented as a traditional filing folder and may be utilized to group, or "store," other objects in a way which is meaningful to a user. Such "folders" typically require a user to perform some action in order to select, locate and "store" objects within the "folder." Some known container objects may also be manipulated to perform user specified activities utilizing the objects stored within the container object. For example, a user may specify that all objects stored within a selected container object be printed.

A graphical user interface may display multiple icons which represent objects. A user may utilize an object by positioning a mouse cursor over the icon representing the object, and clicking a mouse button to "open" the object. Once an object is opened, the contents of the object appear displayed in a window.

A window is an area of the graphical user interface with visible boundaries within which information is displayed. Windows typically include a border completely surrounding the window, a status line indicating the name of the window or application being displayed in the window, various buttons to be utilized to maximize or minimize the size of the window, and pull-down menus which may be accessed by selecting a display element. Windows also typically appear in a color or shade different from the color or shade of the background of the graphical user interface in order to distinguish the window from the rest of the graphical user interface.

Once an object is opened, a user may then utilize the object, such as by revising the text of an object created by a word processing application. Once a user has completed the utilization, the user may store the revisions and "close" the application at which time the window will disappear.

A container object may be utilized to group objects. A user may utilize an object grouped within a container object by first "opening" the container object, viewing the contents of the container object, and then selecting and "opening" an object, as described above, stored within the container object. A user may utilize an object stored within a container object without actually removing the object from its container object. Once the user has completed utilization of the object, the user may "close" the object. When the object is closed, the window utilized to display the contents of the object will disappear, and the object remains stored in its container object throughout the utilization of the object.

A user may desire to first remove an object from its container object before utilizing it. In this case, a user must first "open" a container object, and then select and remove the object from its container object. The object may then be utilized. Once the object is removed from its container object, it is no longer associated with the container object. Therefore, when the object is "closed," it is no longer stored in its original container object. Once the object is "closed," it is stored in its current location. Its current location may be in a different container object, or in the graphical user interface independently of any container object.

It should therefore be apparent that a need exists for a method and system for the automatic storage of an object within a container object within a graphical user interface in a data processing system in response to completion of utilization of the object.

SUMMARY OF THE INVENTION

It is therefore one objective of the present invention to provide an improved graphical user interface in a data processing system.

It is another objective of the present invention to provide an improved method and system for the automatic storage of an object within a container object within a graphical user interface in a data processing system.

It is yet another objective of the present invention to provide an improved method and system for the automatic storage of an object within a container object within a graphical user interface in a data processing system in response to a completion of utilization of the object.

The foregoing objectives are achieved as is now described. A method and system are disclosed for the automatic storage of an object within a container object within a graphical user interface within a data processing system. A display, included within the data processing system, is utilized to display an iconic representation of a container object which is a graphic indication of a storage of objects. An object and a container object within the graphical user interface are specified. The object is thereafter associated with the container object. During utilization the object is removed from the container object. The object is then automatically stored within the container object in response to a completion of the utilization, wherein the organization of objects within the container object and the graphical user interface are enhanced.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
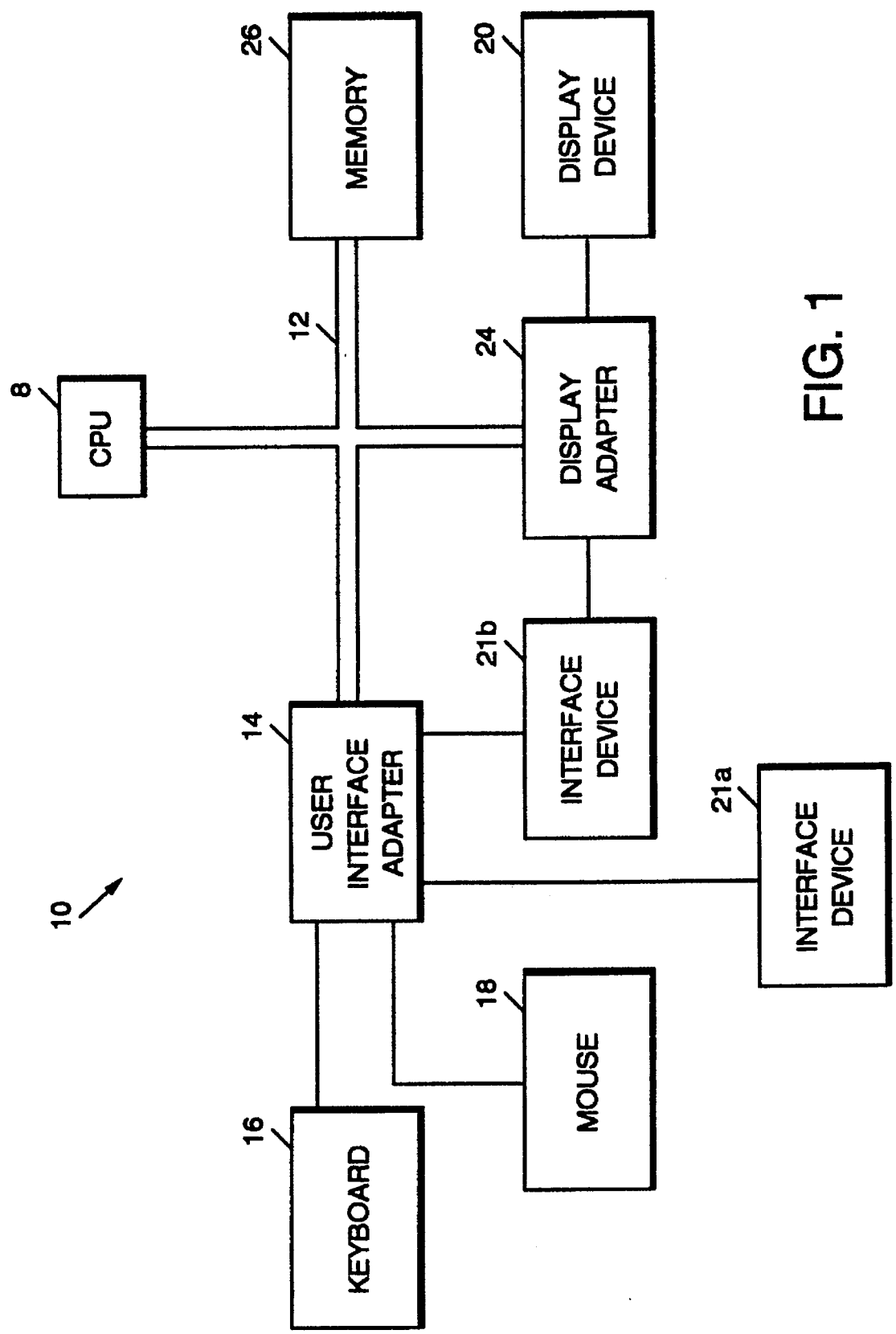
FIG. 1 depicts a pictorial representation of a data processing system which may be utilized to implement the method and system of the present invention.

An embodiment of the present invention will now be described with initial reference to FIG. 1, which illustrates a representative data processing system 10 in which the present invention may be practiced. Data processing system 10 includes a central processing unit (CPU) 8, which may be the processor of a host computer or the microprocessor of a work station or personal computer or the like. In any case, known means, such as a bus 12, are employed to connect the CPU 8 to one or more interface devices, such as keyboard 16, a mouse 18, and/or other interface devices 21a and 21b, which can be any user interface device, such as a touch sensitive screen, a digitized pen entry pad, etc. A display device 20, such as an LCD screen or CRT screen, is connected to CPU 8 via a display adapter 24. CPU 8 is also connected to memory 26, which can include ROM, RAM, etc. In a preferred embodiment of the present invention, CPU 8 is suitably programmed to implement the logic flow charts of FIGS. 5 through 8 in order to provide automatic storage of an object within a container object in a graphical user interface in a data processing system.

Figure 2:
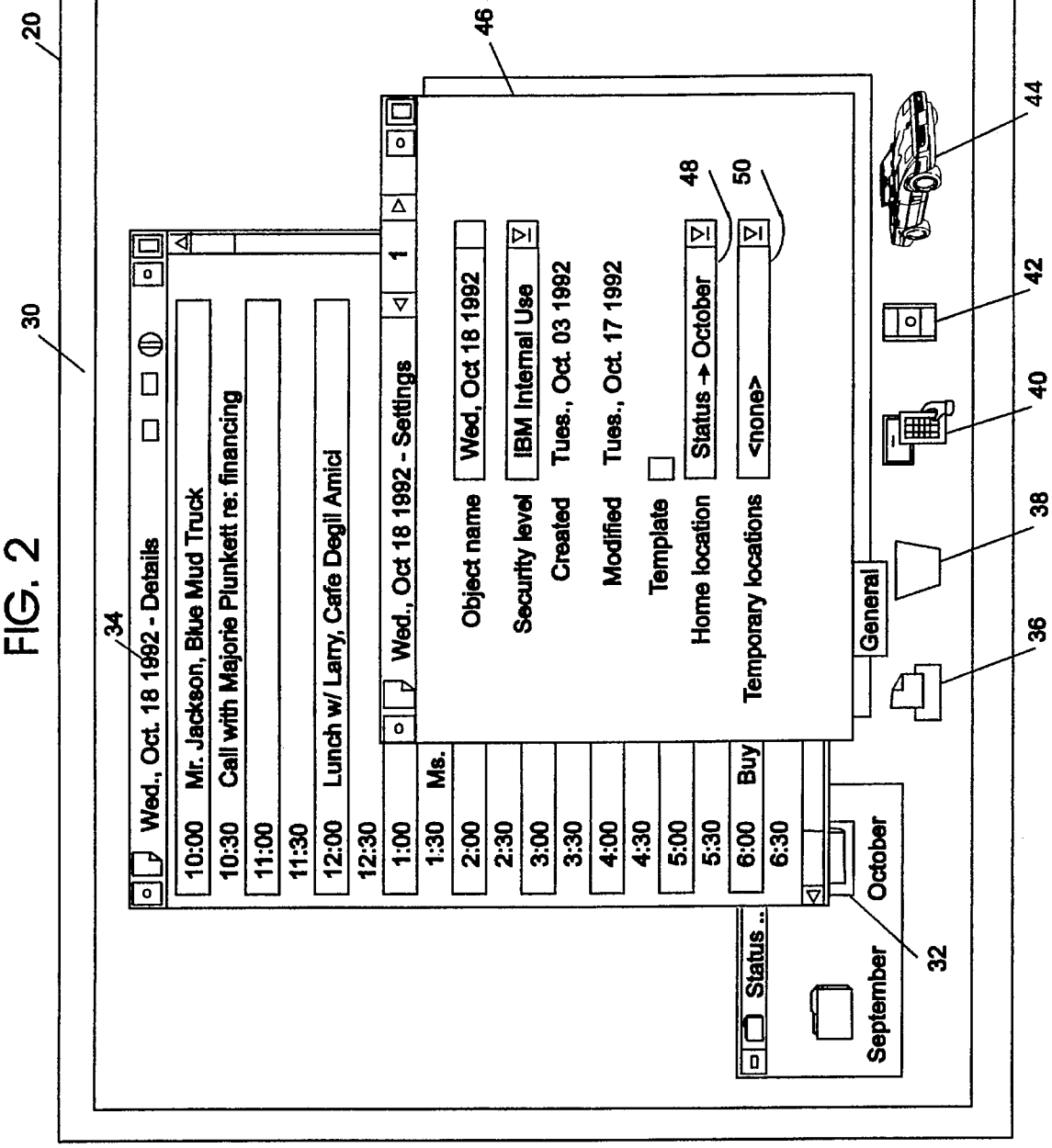
FIG. 2 illustrates a graphical user interface including an object and a setting's page of the object, wherein a home location may be specified in accordance with the present invention.

FIG. 2 illustrates a graphical user interface including an object and a setting's page of the object, wherein a home location may be specified in accordance with the present invention. An object may be graphically represented to a user as an "icon" utilizing the graphical user interface. An object is an item which may be manipulated as a unit. Those skilled in the art should appreciate that a user may manipulate either an object or an icon representing the object to achieve the same result. Container objects are typically objects into which other objects may be stored. Therefore, objects may be stored together in a container object and manipulated as a unit by manipulating the container object.

As those skilled in the art are well aware, a graphical user interface environment for a data processing system is implemented with computer readable code, also known as software, which is executed on the appropriate hardware. The flowcharts of FIGS. 5–8 describe the logical steps carried out by software in which the present invention is embodied for execution on hardware. Software program code of this nature is typically stored in the memory of a workstation. The software program code may be embodied on any of a variety of known media for use with a data processing system, such as a diskette or CD-ROM. The code may be distributed on such media, or may be distributed to users from the memory of one computer system over a network of some type to other computer systems for use by users of such other systems. Such techniques and methods for embodying the software code on media and/or distributing software code are well known, and will not be further discussed herein.

A container object 32 is displayed within graphical user interface 30 and may be utilized to group related objects. For example, container object 32 may be utilized to group objects associated with the days of October. An object 34 has been removed from container object 32 and opened to display the contents of object 34. Other icons 36, 38, 40, 42, and 44 are also displayed within graphical user interface 30. These icons may represent any type of object.

A user may remove object 34 from container object 32 in order to utilize it. In known systems, once a user has completed utilizing object 34, the user must remember the home location for object 34, and must physically return object 34 to its home. Those skilled in the art should appreciate that either an object, or an icon representing an object, may be manipulated, such as by removal, and returned to a container object.

In accordance with the present invention, a home location for object 34 may be specified in home location field 48 within a settings page 46 of object 34. A settings page associated with each object is utilized to define characteristics of the object, such as object name, security level, creation and modification dates.

When the user has completed utilization of object 34, object 34 may be automatically returned to its specified home location, or a temporary location, if one is specified. A temporary location may be specified in temporary location field 50 within settings page 46.

Figure 3:
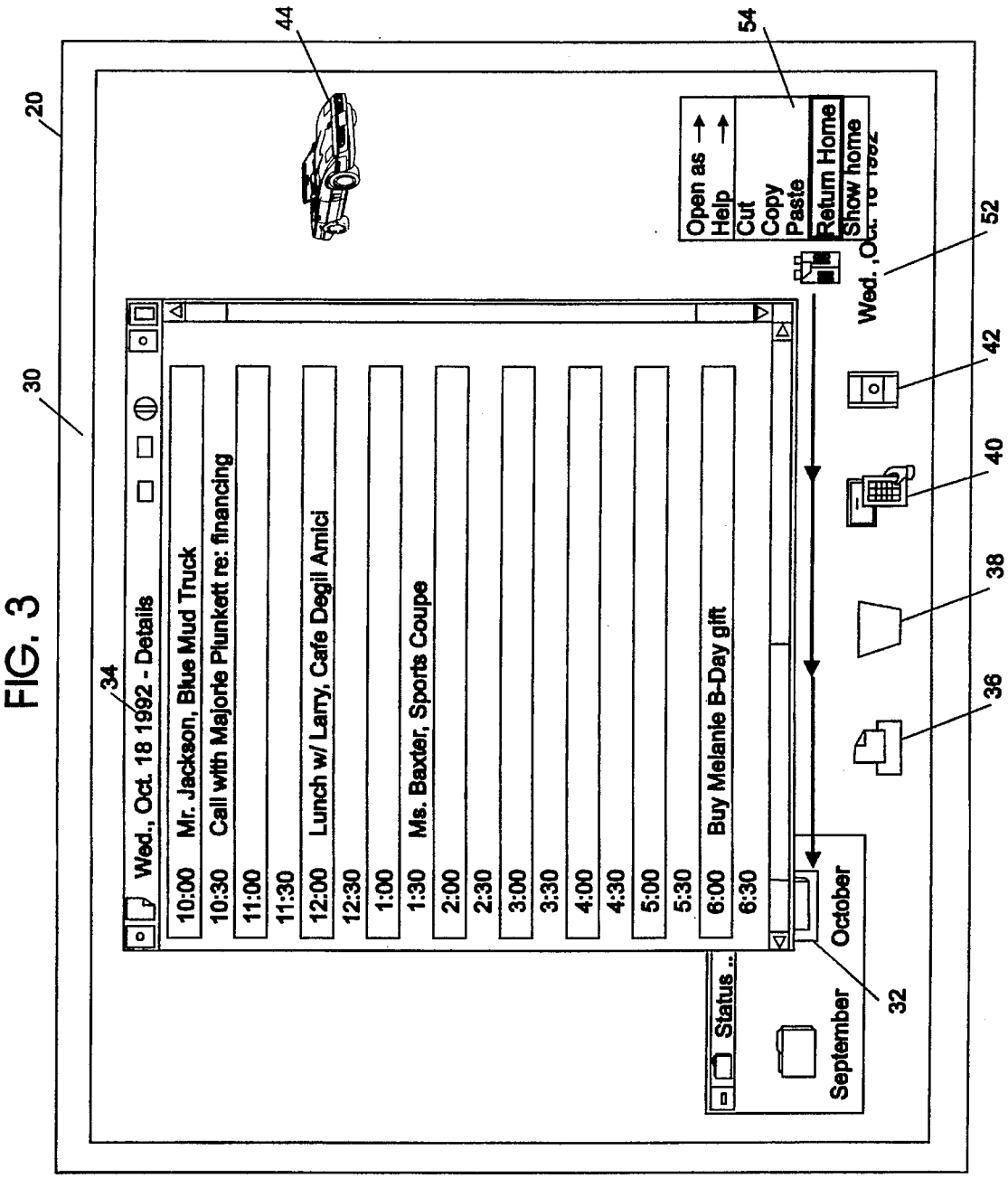
FIG. 3 depicts a graphical user interface including an object and an indication that the object is being returned to its home location in accordance with the present invention.

FIG. 3 depicts a graphical user interface including an object and an indication that the object is being returned to its home location in accordance with the present invention. Icon 52 represents object 34. A user may select "Return Home" in menu 54 in order to return object 34 to its specified home location, container object 32. An arrow is displayed in FIG. 3 for illustrative purposes to indicate object 34, represented as icon 52, being returned to container object 32.

Figure 4:
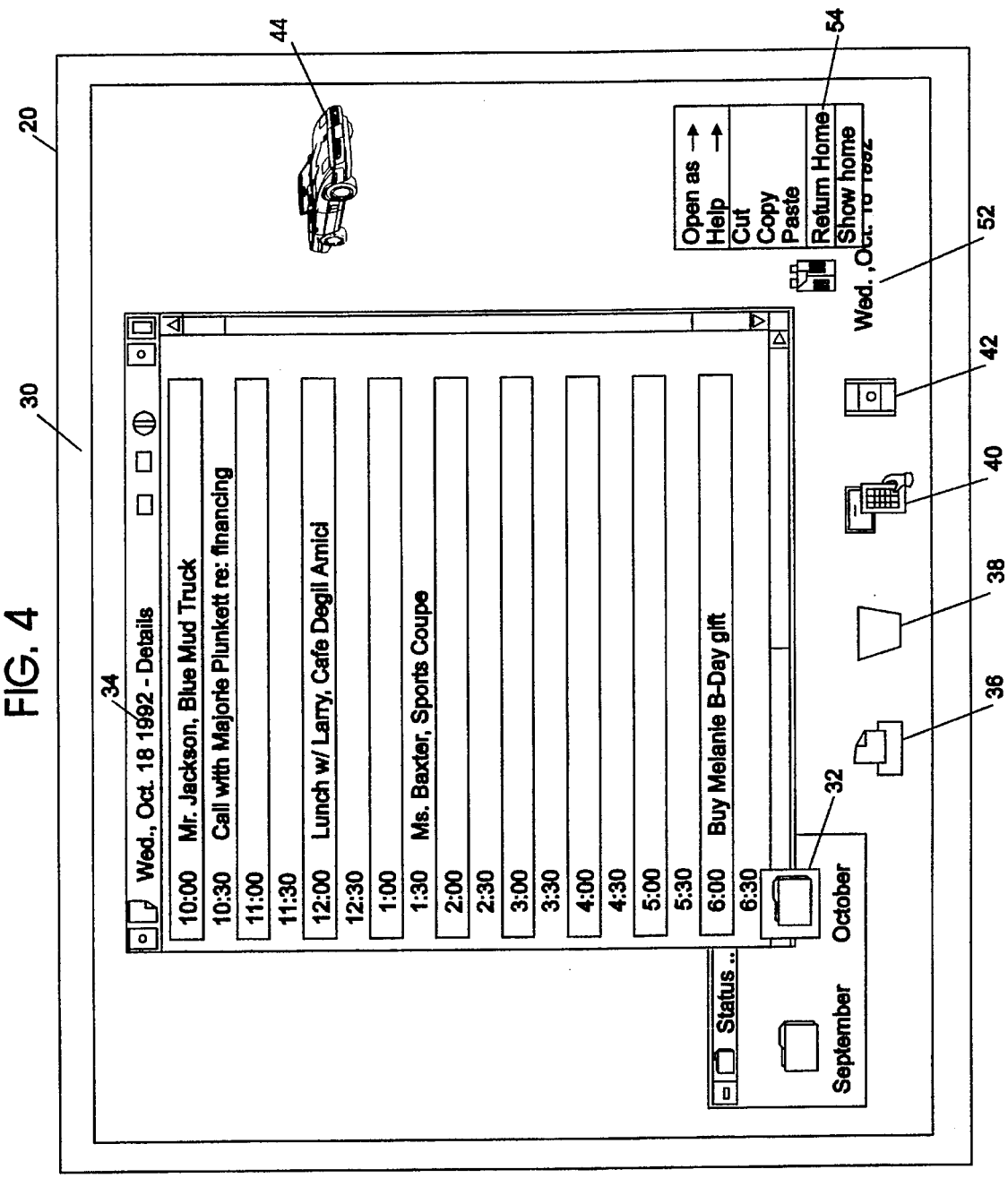
FIG. 4 illustrates a graphical user interface including an object and an indication of the home location of the object in accordance with the present invention.

FIG. 4 illustrates a graphical user interface including an object and an indication of the home location of the object in accordance with the present invention. A user may wish to determine the home location to which ah object may return without actually having the object return to its home location. A user may select "Show Home" in menu 54 associated with object 34 represented by icon 52. A selection emphasis, such as the displaying of a box around the container object which is the specified home location, is then displayed to indicate the specified home location for object 34.

Figure 5:
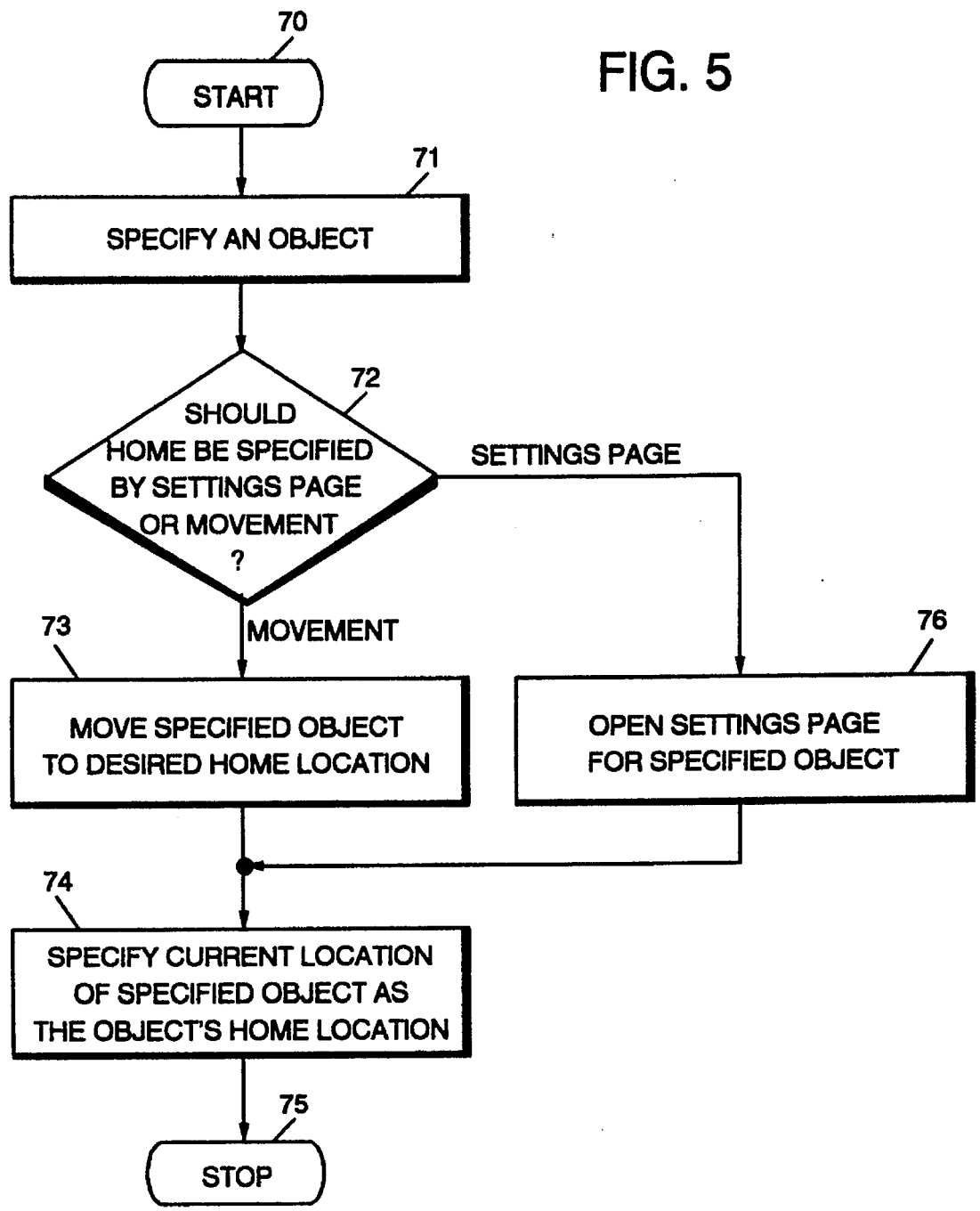
FIG. 5 is a high level flow chart depicting a specification of a home location for an object in accordance with the present invention.

FIG. 5 is a high level flow chart depicting a specification of a home location for an object by a user in accordance with the present invention. The process starts as depicted at block 70 and thereafter passes to block 71 which illustrates the specification of an object. Next, the process passes to block 72 which depicts a determination of whether or not a home location should be specified by moving the specified object, or by opening a settings page associated with the specified object. If a determination is made to specify a home location by moving the specified object, the process passes to block 73 which depicts the movement of the specified object to a desired home location. Thereafter, the process passes to block 74 which illustrates the specification of the current location of the object as the object's home location. The process then terminates as illustrated at block 75.

Referring again to block 72, if a determination is made to specify a home location by opening a settings page, the process passes to block 76 which illustrates the opening of a settings page associated with the specified object. The process again passes to block 74.

Figure 6:
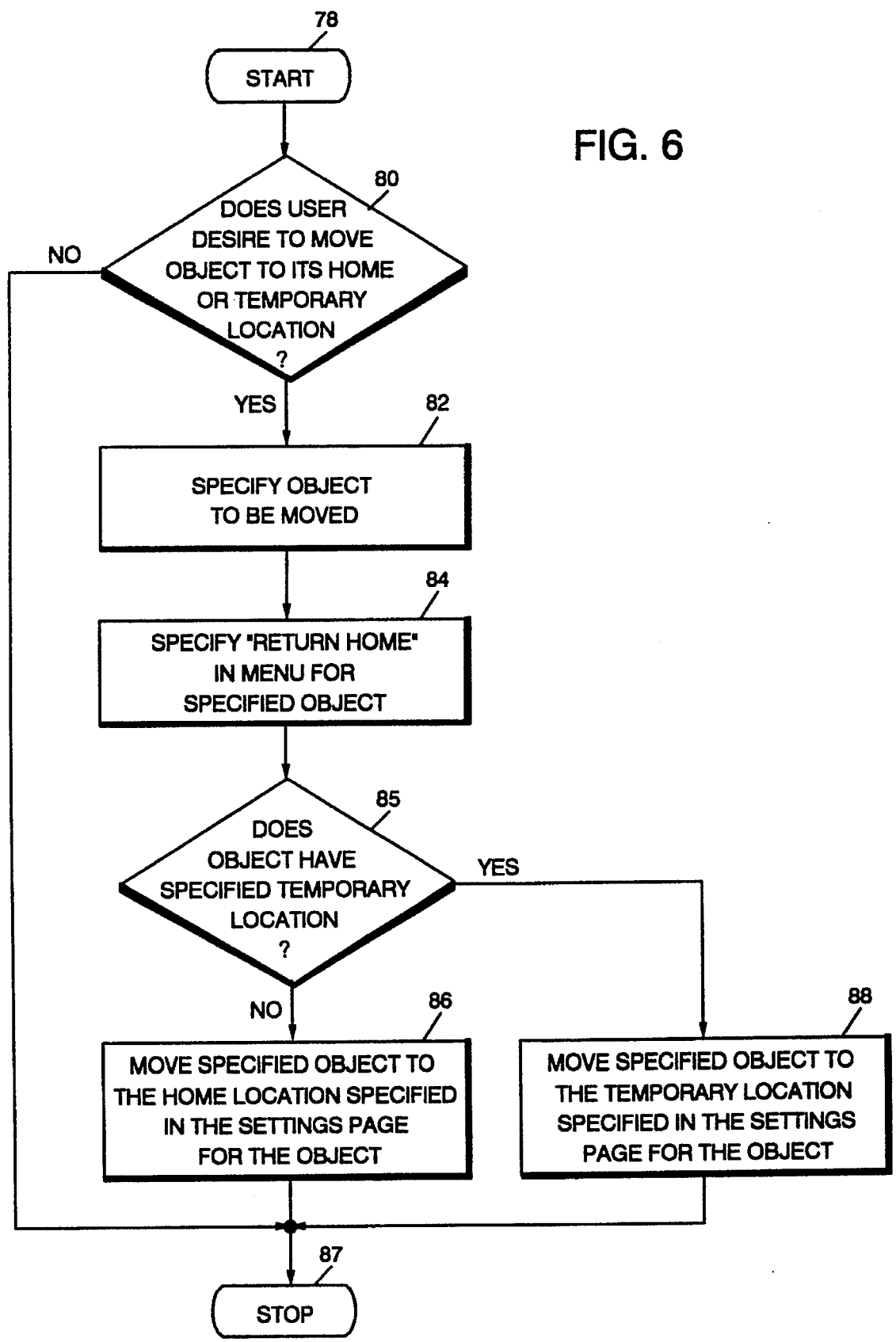
FIG. 6 is a high level flow chart illustrating the returning of an object to its specified home location in accordance with the present invention.

FIG. 6 is a high level flow chart illustrating the returning of an object to its specified home location or to a specified temporary location in accordance with the present invention. The process starts as depicted at block 78 and thereafter, passes to block 80 which illustrates a determination of whether or not a user desires to move an object to its home location. If a determination is made that a user desires to move an object to its home location, the process passes to block 82 which illustrates the specification of an object to be moved. Next, the process passes to block 84 which depicts the specification of "Return Home" in a menu for the specified object. Thereafter, the process passes to block 85 which illustrates a determination of whether or not a temporary location has been specified. If a temporary location has not been specified, the process passes to block 86 which depicts the movement of the specified object to the home location specified in the settings page for the object. Thereafter, the process terminates as depicted at block 87.

Referring again to block 85, if a determination is made that the object does have a specified temporary location, the processes passes to block 88 which illustrates the movement of the object to the specified temporary location. The process then terminates as depicted at block 87. Referring again to block 80, if a determination is made that a user does not desire to move an object to its home location, the process terminates again as depicted at block 87.

Figure 7:
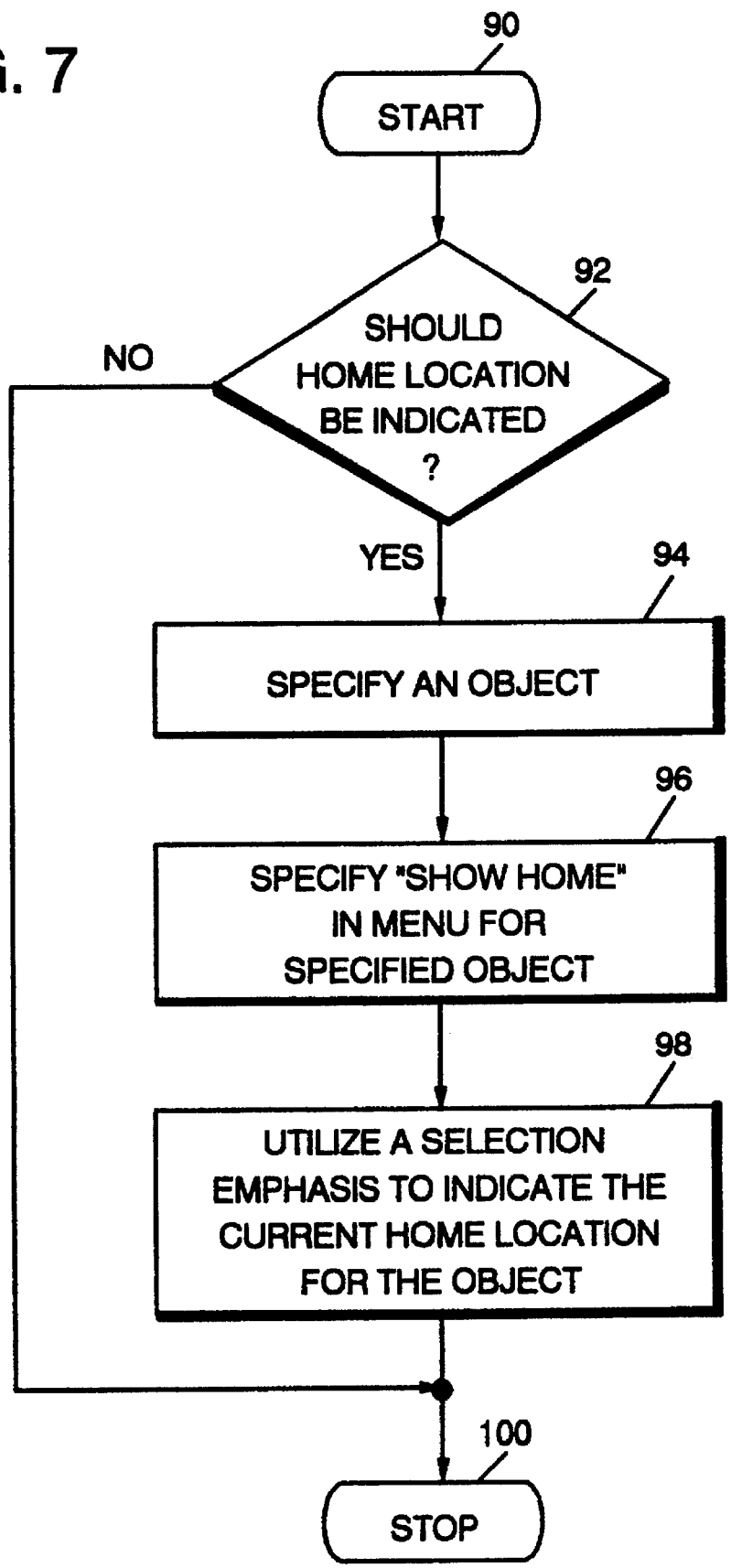
FIG. 7 is a high level flow chart depicting the indication of the home location for a specified object in accordance with the present invention.

FIG. 7 is a high level flow chart depicting the indication of a home location for a specified object in accordance with the present invention. The process starts as depicted at block 90 and thereafter passes to block 92, which illustrates a determination of whether or not a home location should be visually indicated to a user utilizing the graphical user interface. If a determination is made that a home location should be indicated, the process passes to block 94 which illustrates the specification of an object. Next, the process passes to block 96 which depicts the specification of "Show Home" in a menu for the specified object. The process then passes to block 98 which illustrates a utilization of a selection emphasis to indicate the home location. For example, a selection emphasis may include the displaying of a box around the container object which is the home location of the specified object. Thereafter, the process terminates as depicted at block 100. Referring again to block 92, if a determination is made that a home location should not be indicated, the process terminates again as depicted at block 100.

Figure 8:
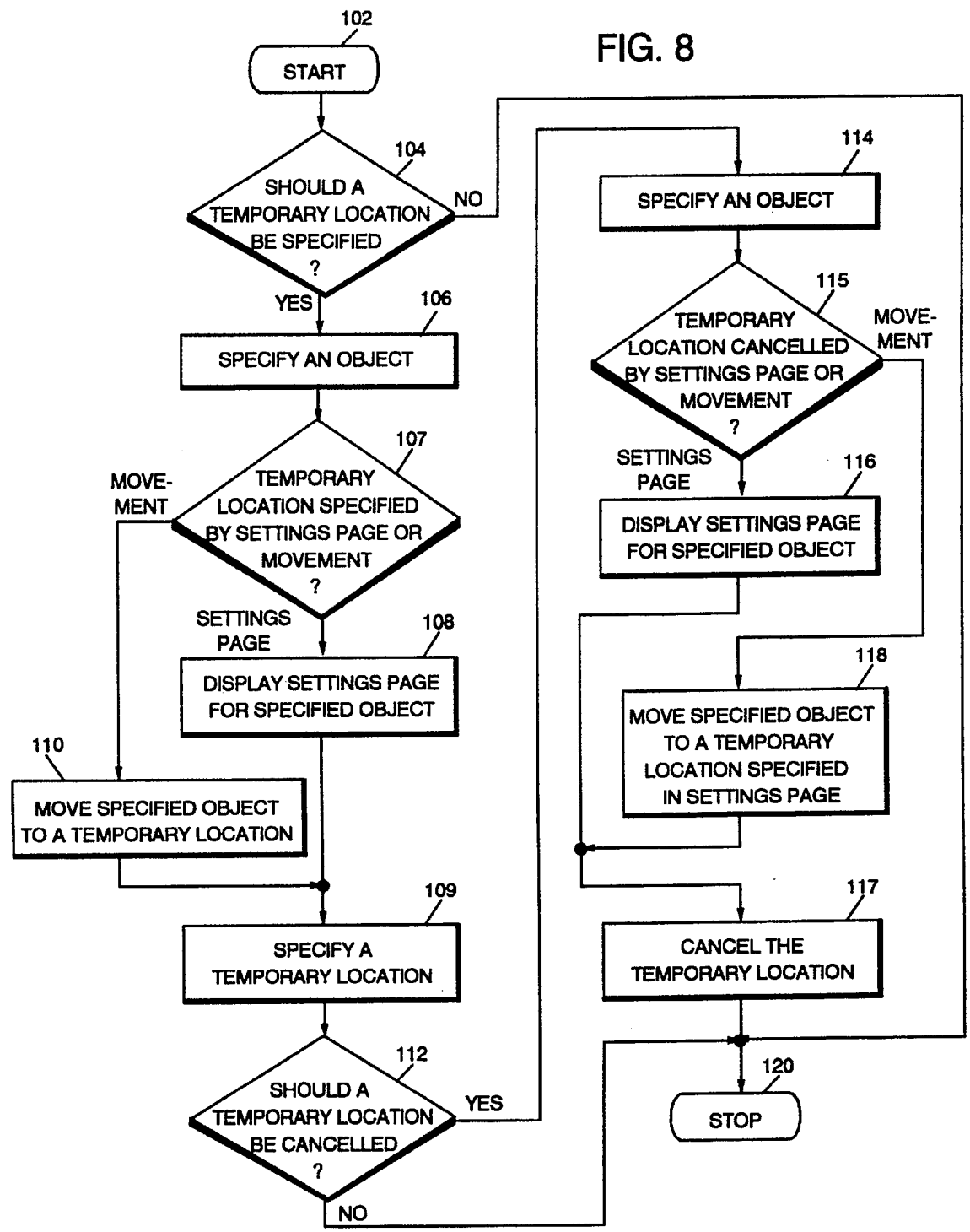
FIG. 8 is a high level flow chart illustrating a specification of a temporary location for a specified object in accordance with the present invention.

FIG. 8 is a high level flow chart illustrating a specification of a temporary location for a specified object in accordance with the present invention. The process starts as depicted at block 102 and thereafter passes to block 104 which illustrates a determination of whether or not a temporary location should be specified. If a determination is made that a temporary location should be specified, the process passes to block 106 which depicts the specification of an object. Next, the process passes to block 107 which illustrates a determination of whether or not a temporary location should be specified utilizing a settings page associated with the object, or by moving the object to the temporary location. If a determination is made that a temporary location should be specified by utilizing a settings page, the process passes to block 108 which illustrates the displaying of a settings page for the specified object. Thereafter, the process passes to block 109 which illustrates the specification of a temporary location within the settings page. The process then passes to block 112.

Referring again to block 107, if a determination is made to specify a temporary location by moving the specified object, the process passes to block 110 which depicts the movement of the specified object to a temporary location. The process then again passes to block 109.

Next, the process passes to block 112 which illustrates a determination of whether or not a temporary location should be canceled. If a determination is made that a temporary location should be canceled, the process passes to block 114 which depicts the specification of an object. Thereafter, the process passes to block 115 which illustrates a determination of whether or not a temporary location should be cancelled utilizing a settings page associated with the specified object, or by moving the object to the temporary location to be cancelled. If a determination is made to cancel a temporary location utilizing a settings page, the process passes to block 116 which illustrates the displaying of a settings page for the specified object. Next, the process passes to block 117 which illustrates the canceling of the temporary location within the settings page of the specified object. The process then terminates as depicted at block 120.

Referring again to block 115, if a determination is made to cancel a temporary location by moving the specified object, the process passes to block 118 which depicts the movement of the specified object to the temporary location. Thereafter, the process passes to block 117. Referring again to block 104, if a determination is made that a temporary location should not be specified, the process again terminates as depicted at block 120. Referring again to block 112, if a determination is made that a temporary location should not be canceled, the process again terminates as depicted at block 120.

While the invention has been particularly shown and described with reference to a preferred embodiment, it will be understood by those skilled in the art that various changes in form and detail may be made therein without departing from the spirit and scope of the invention.

What is claimed is:

1. In a data processing system including a graphical user interface, a method for automatically storing an object within a container object within said data processing system, said data processing system including a display for displaying an iconic representation of said container object, wherein said object is a graphic object which removable from said container object for utilization, said method comprising the data processing system implemented steps of:

specifying an object within said graphical user interface;

specifying a container object within said graphical user interface;

associating said object with said container object;

removing said object from said container object for utilization; and automatically storing said object within said container object in response to completion of said utilization of said object, wherein organization of said objects within said container object is enhanced.

2. In a data processing system including a graphical user interface, a method for automatically storing an object within a container object within said data processing system according to claim 1, wherein said graphical user interface includes a plurality of container objects, further comprising the steps of:

determining if a temporary relationship between said object and a second of said plurality of container objects has been specified; and thereafter, automatically storing said object within said second of said plurality of container objects in response to a determination that said temporary relationship between said object and a second of said plurality of container objects has been specified.

3. In a data processing system including a graphical user interface, a method for automatically storing an object within a container object within said data processing system according to claim 1, further comprising a step of displaying an indication of said container object in response to a utilization of said object.

4. A data processing system including a graphical user interface for automatically storing an object within a container object within said data processing system according to claim 1, further comprising means for displaying an indication of said container object in response to a utilization of said object.

5. A data processing system including a graphical user interface for automatically storing an object within a container object within said data processing system, said data processing system including a display for displaying an iconic representation of said container object, wherein said object is a graphic object which removable from said container object for utilization, comprising:

means for specifying an object within said graphical user interface;

means for specifying a container object within said graphical user interface;

means for associating said object with said container object;

means for removing said object from said container object for utilization; and means for automatically storing said object within said container object in response to completion of said utilization of said object, wherein organization of said objects within said container object is enhanced.

6. A data processing system including a graphical user interface for automatically storing an object within a container object within said data processing system according to claim 5, wherein said graphical user interface includes a plurality of container objects, further comprising:

means for determining if a temporary relationship between said object and a second of said plurality of container objects has been specified; and means for thereafter, automatically storing said object within said second of said plurality of container objects in response to a determination that said temporary relationship between said object and a second of said plurality of container objects has been specified.

* * * * *